Patented July 11, 1939

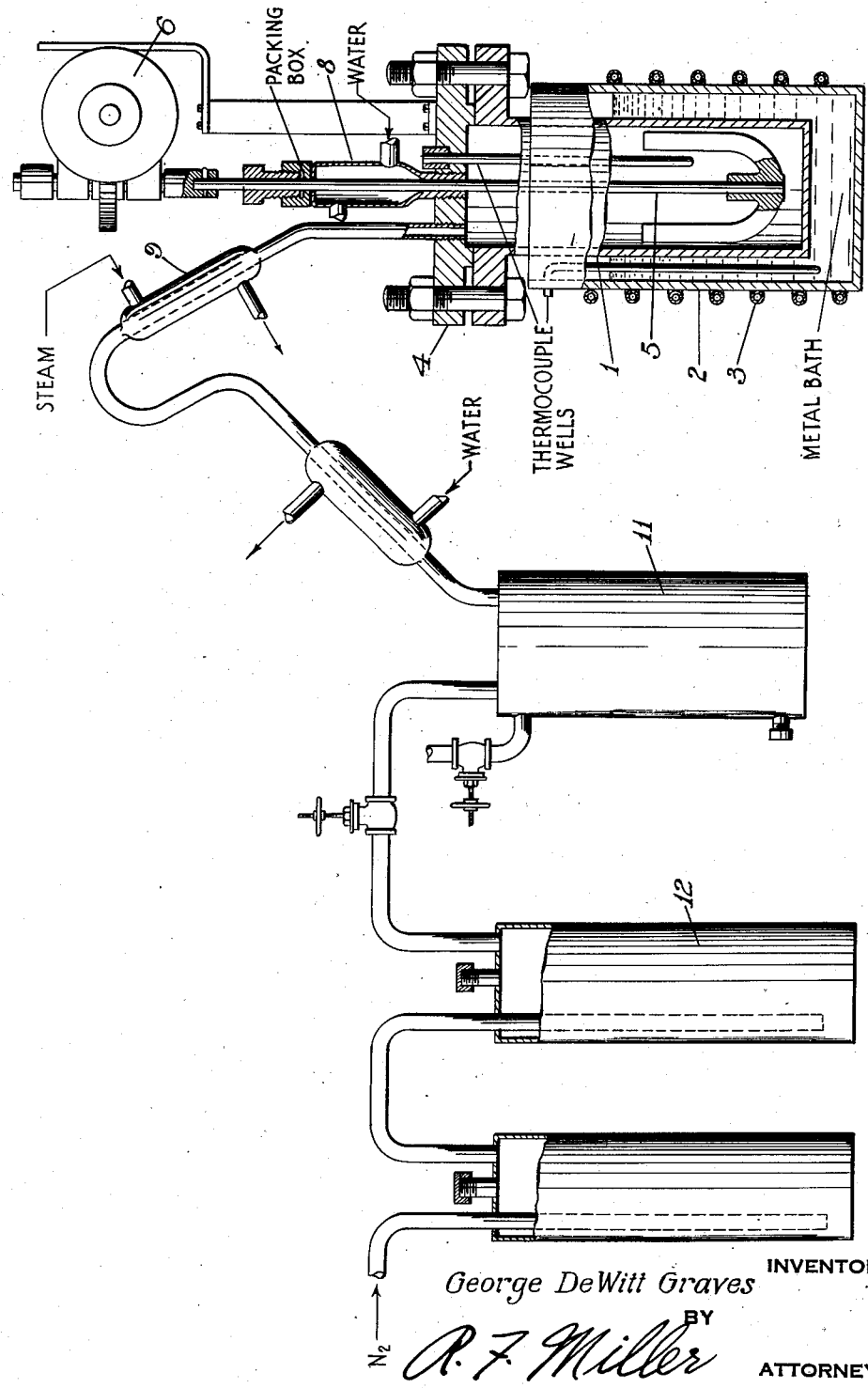

2,165,253

UNITED STATES PATENT OFFICE 2,165,253

PREPARATION OF POLYAMIDES

George De Witt Graves, Wilmington, Del., assignor to E. I. du Pont de Nemours & Company, Wilmington, Del., a corporation of Delaware Application October 13, 1936, Serial No. 105,425
In Germany July 15, 1936

6 Claims. (Cl. 260—78)

This invention relates to the manufacture of polymeric materials and more particularly to improved methods for making polyamides.

The present invention while applicable to the production of polyamides generally is concerned more particularly with the manufacture of the highly polymerized polyamides (superpolyamides) which may be drawn into useful fibers and which are described in the applications of W. H. Carothers Serial Number 548,701, filed July 3, 1931, Patent No. 2,071,250 and Serial Numbers 180 and 181, filed January 2, 1935, Patent Nos. 2,071,253 and 2,130,523.

The polyamides described prior to my invention have been made in glass reactors. In small scale production such reactors are satisfactory since light colored polyamides useful in the manufacture of fibers are readily made therein. Glass reactors, however, are unsatisfactory for large scale production, since they are easily broken and do not withstand much pressure. Porcelain and enamel-lined reactors though operable also have disadvantages, while the cost of the inert precious metals, e. g. platinum, and their alloys tend to prohibit their use in large scale production. But when it is attempted to overcome the disadvantages of the reactors just mentioned by their replacement with reactors made of available and reasonably priced metals, other than those claimed herein which are inert to the corrosive agents used under the conditions specified, it is found that the polyamides are undesirably dark colored.

This invention therefore has as an object the preparation of light colored polyamides in reactors suitable for large scale manufacture. Another object is to provide an economical, efficient, and novel procedure for the preparation of polyamides. A further object is to disclose readily accessible materials for the construction of reactors suitable for the manufacture of satisfactory polyamides and to disclose the conditions under which these reactors are to be used. Other objects will appear hereinafter.

These objects are accomplished by preparing polyamides in reactors constructed of or lined with silver, tantalum, chromium-containing ferrous metals, or chromium-plated metals, under oxygen-free conditions.

By the term "reactor" as used in the specification and claims, I mean a vessel or device for carrying out a chemical reaction, such as the preparation of polyamides herein described.

In searching for a suitable material of construction which would be inert to the corrosive reagents used in the polyamide reactions and which at the same time would permit the formation of light colored polymers, the applicant discovered that the non-oxiding metals of the class consisting of silver, tantalum, chromium-plated metals, and chromium-containing ferrous metals could be used satisfactorily provided the oxygen was rigidly excluded. These metals cannot be used in the preparation of light colored polyamides in the presence of oxygen even when the oxygen is present in relatively small amounts. When solutions of polyamide-forming reactants are heated in glass reactors and commercial nitrogen is passed through the mixture during the reaction, products of fair color are obtained. Under the same conditions, however, silver, tantalum, chromium-plated metals, and chromium-containing ferrous metals yield darker colored polyamides induced apparently by the small amount of oxygen present in the nitrogen. This is very surprising since these metals are commonly considered as non-oxidizing metals. When oxygen is rigidly excluded by carrying out the reaction in the presence of nitrogen which has been carefully washed free from oxygen, light colored products are obtained. However, when other non-oxidizing metals, such as nickel and Monel metal, are used even in the complete absence of oxygen, dark colored products are invariably obtained although these metals show almost no loss in weight under these conditions. The metals used in the practice of this invention are therefore unique in that they do not, in the absence of oxygen, catalyze the discoloration of polyamides and polyamide-forming reactants. Furthermore, these metals, unlike copper, aluminum, and the like, can be used in the presence of phenols which are sometimes used as diluents in the preparation of polyamides.

In order to obtain light colored polyamides in reactors constructed of or lined with silver, tantalum, chromium-plated metals, or chromium-containing ferrous metals, it is necessary to remove oxygen quite completely from the reactor and the reactants. This can be done by placing the reactants in the reactor, evacuating the system, introducing oxygen-free nitrogen, and preferably repeating the evacuation and introduction of oxygen-free nitrogen a second time. Commercial nitrogen cannot be used for this purpose. Even a high grade commercial nitrogen containing as little as 0.05% oxygen is unsatisfactory in that it results in formation of dark colored products. The nitrogen used for this purpose must contain less than 0.03% oxygen and preferably less than 0.01% oxygen. The oxygen-free nitrogen required can be prepared by washing ordinary commercial nitrogen with suitable oxygen absorbers. A very suitable oxygen remover consists of a solution prepared by dissolving 16.5 parts by weight of sodium hydrosulfite, 13.3 parts by weight of sodium hydroxide, and 4 parts by weight of "silver salt" (anthraquinone beta-sulfonate sodium salt) in 100 parts by weight of water. However, the ingredients may be used in other proportions. Other oxygen absorbers, such as pyrogallol solutions, may also be used. Moreover, in place of using oxygen-free nitrogen, other inert gases which do not contain oxygen may be used. When oxygen-free nitrogen is used, it may of course contain inert gases such as neon, argon, methane, and the like.

The requirements for making polyamides of the fiber-forming kind are described in the above mentioned applications. Polyamide-forming reactants are heated to reaction temperature, usually from 100 to 300° C., and preferably at 150–290° C., in the presence or absence of a solvent or diluent and the heating continued with the removal of volatile reaction products until the polyamide formed is capable of being drawn into continuous filaments which may be used as such as in the case of bristles, or which are formed into useful fibers by cold-drawing, that is by subjecting the filaments to tension in the solid state, usually at ordinary temperature. The fibers thus formed show by X-ray examination fiber orientation along the fiber axis. They are strong and pliable and may be formed into yarns and made into fabrics. The polyamides used in the practice of this invention are made from diamines and dibasic carboxylic acids (the dibasic carboxylic acids meaning also their amide-forming derivatives) or by polymerizing amino acids (meaning also their amide-forming derivatives) under the conditions mentioned above for reacting these polyamide-forming reactants.

In the accompanying drawing the single figure is an elevation partly in section of an autoclave for preparing polyamides in accordance with my invention.

The reactor consists of a vessel 1 in a metal heating bath contained in the surrounding vessel 2 provided with suitable heating means, as for instance to the calrod heaters 3. The vessel 1 has a top plate 4 through which passes the mechanical stirrer 5 rotated by a motor 6 through a gear drive. The stuffing box is cooled by water cooler 8.

When the reaction is conducted in an inert solvent, the solvent is returned to the reactor by means of the steam heated reflux 9 through which the conduit is continued to a downwardly leading condenser 10 opening into a receiver 11. The receiver 11 is connected to scrubbers 12 which contain a suitable substance for absorbing oxygen in producing the oxygen-free gas which is introduced into the reactor.

The following examples in which parts are by weight illustrate the process of this invention:

*Example I*

The reaction used in this preparation was an 18:8 alloy steel autoclave of the type shown in the drawing. It was equipped with a stirrer and thermocouple well made of 18:8 alloy steel. The autoclave was surrounded by a heating bath containing Wood's metal. This bath was provided with calrod electric heaters controlled by a Brown pyrometer. The head of the autoclave was equipped with a steam-heated reflux condenser the upper end of which was connected through a water-cooled downward condenser to a receiver. The purpose of the receiver was to collect the volatile product of the reaction, namely, water. The receiver was also connected in series with two scrubbers containing sodium hydrosulfite-"silver salt" solution, the more remote of which was connected to a cylinder of nitrogen. Pressure can be applied to the autoclave by introducing nitrogen which passes through the scrubbing towers, which remove oxygen, and then through the receiver and condenser into the autoclave.

The autoclave was charged with a mixture of 524 parts by weight of hexamethylene diammonium adipate (salt derived from hexamethylenediamine and adipic acid) and 4.72 parts of hexamethylene diammonium acetate. Substances such as the last mentioned one are included as viscosity stabilizers and are claimed in application Serial Number 83,809, filed June 5, 1936. Air was removed from the autoclave by evacuation and a gas pressure of 80 pounds was applied by introducing nitrogen from the cylinder. Since the nitrogen passed through the scrubbers before entering the autoclave, it was oxygen-free. Heating was started and when the temperature of the metal bath was 288° (reached in about 90 minutes) the pressure was slowly decreased to atmospheric during 30 minutes. Heating at 288° C. was continued for two hours and the autoclave was evacuated during the last hour. The stirrer was operating at a rate of 18 R. P. M. throughout the reaction except during the period of evacuation. The autoclave was then cooled and the resulting polymer was removed as a solid white cake. It had an intrinsic viscosity of 0.97 and had excellent spinning properties.

*Example II*

A mixture of 500 parts of hexamethylene diammonium adipate and 4.68 parts of hexamethylene diammonium acetate was placed in a silver-lined steel autoclave equipped with an 18:8 alloy steel, (i. e., 18% chromium, 8% nickel, approximately 74% iron, and less than 0.2% carbon) stirrer and an 18:8 alloy steel steam-heated reflux condenser, the top of which was connected by a water-cooled downward condenser to a receiver. The air was removed from the autoclave by evacuation followed by filling the autoclave with nitrogen and evacuating again. A nitrogen pressure of 80 pounds was then applied. The nitrogen used for this purpose was commercial nitrogen which had been washed with sodium hydrosulfite "silver salt" solution of the concentration previously mentioned, to remove substantially the last traces of oxygen. The stirrer was started and the autoclave heated to 288° C. during 1.5 hours. The pressure was then reduced to atmospheric during 0.5 hour and the heating and stirring continued for 2.5 hours. After cooling, the polymer was removed from the autoclave as a solid white cake. It melted at 248° C., and had an intrinsic viscosity of approximately 0.9. It yielded good fibers on spinning from melt or from solution.

*Example III*

A mixture of 318 parts of decamethylene diammonium adipate (salt derived from decamethylenediamine and adipic acid), 5 parts of decamethylene diammonium acetate, and 500 parts of o-hydroxydiphenyl was heated at 260–270° C.

for 7 hours in a vessel constructed of chromium-plated steel, the layer of chromium being 0.002" in thickness. The reaction was carried out under oxygen-free conditions using purified nitrogen following the method described in the preceding examples. The polyamide obtained in this way was a white opaque solid melting at about 225° C. It was readily spun into fibers of excellent quality.

Among other diamines and dibasic acids which may replace those of the examples with similar results there may be mentioned glutaric acid, pimelic acid, suberic acid, sebacic acid, p-phenylenediacetic acid, tetramethylenediamine, pentamethylenediamine, octamethylenediamine, and p-xylylenediamine. Mixtures of diamines and dibasic acids may also be used in which case interpolymers are formed.

As previously mentioned, the fiber-forming reactants instead of being diamines and dibasic acids as used in the examples above may be a polymerizable amino acid, the amino and carboxyl groups of different molecules of said acid reacting with each other to likewise form a linear condensation product. Examples of suitable amino acids are 6-aminocaproic acid, 9-aminononanoic acid, and 11-aminoundecanoic acid. Amide-forming derivatives of the polymerizable amino acids may likewise be used. It is also possible to use an acid of this type in conjunction with a diamine-dibasic acid mixture.

The most valuable application of the present invention is the manufacture of fiber-forming polyamides which are best made from diamines of the formula $NH_2CH_2RCH_2NH_2$ and dicarboxylic acids of the formula $HOOCCH_2R'COOH$, or amide-forming derivatives thereof, R and R' in the said formulae being divalent hydrocarbon radicals free from non-benzenoid unsaturation and R having a chain length of at least two carbon atoms. This invention, however, is applicable also for the preparation of polyamides from polyamide-forming reactants which yield products less suitable for fiber-forming but of considerable value in the coating and molding fields because of their resinous nature.

In the preparation of polyamides from diamines and dibasic acids it is not necessary to use the preformed salt as illustrated in the examples. The metal reactors herein described can also be used in the preparation of light colored polyamides directly from diamines and dicarboxylic acids or amide-forming derivatives of dibasic carboxylic acids, such as the ester, amide, or anhydride, without first isolating the salt.

As indicated in Example III, solvents may be used in the reaction. As additional examples of such solvents might be mentioned phenol, cresol, and xylenol. Monohydric phenols are especially useful as solvents. Non-solvents, such as white medicinal oil or other hydrocarbons or inert chlorinated hydrocarbons may also be used.

Example I illustrates the use of an austenitic alloy steel containing 18% chromium, 8% nickel, and less than 0.2% carbon and approximately 74% iron. This is an especially useful material for the construction of polyamide reactors. However, this invention contemplates the use of chromium-containing ferrous metals of other compositions, as for instance, chrome irons containing 0.5–28% chromium and chromium-nickel steels containing 0.1–30% chromium and 0.1–25% nickel. The carbon in these chromium-containing ferrous metals may be as high as 0.35% but preferably it should be below 0.10%. Some impurities, such as silicon, sulfur, and manganese may be present. These alloy steels may also contain some molybdenum.

The necessity for excluding oxygen during the preparation of polyamides in the metal reaction vessels herein described has been emphasized. In order to obtain light colored fibers of good quality from superpolyamides by the melt spinning process it is also necessary to exclude oxygen, e. g. with the use of oxygen-free nitrogen. This is true regardless of whether the spinnerets are made of the metals herein described or from other materials, such as gold, platinum or the like. In fact, molten superpolyamides should always be handled under oxygen-free conditions, if light colored products are desired.

This invention makes possible the use of strong, durable and readily available construction materials in the preparation of polyamide reactors. In other words, the process described herein provides an economical and convenient means for the large-scale production of light colored polyamides of good quality. As previously mentioned, commercial production on a large and economical scale of light colored polyamides was not possible with the reactors previously proposed either because of their lack of strength and constructural disadvantages or because of their cost.

As many apparently widely different embodiments of this invention may be made without departing from the spirit and scope thereof, it is to be understood that I do not limit myself to the specific embodiments thereof except as defined in the appended claims.

I claim:

1. A process for obtaining in large quantities light-colored polyamides which comprises heating under polyamide-forming conditions in the substantial absence of oxygen a polyamide-forming composition in a reaction vessel suitable for large scale production which comprises a non-oxidizing metal of the group consisting of silver, tantalum, and a chromium-containing metal and which presents said metal, and essentially only said metal, in contact with the polyamide-forming composition contained therein, and continuing the heating until said polyamide is obtained.

2. The process set forth in claim 1 in which said polyamide-forming composition comprises a diamine and a dibasic carboxylic acid.

3. The process set forth in claim 1 in which said polyamide-forming composition is a diamine-dicarboxylic acid salt.

4. The process set forth in claim 1 in which said polyamide-forming composition comprises a substance of the class consisting of polymerizable monoaminomonocarboxylic acids and amide-forming derivatives thereof.

5. The process set forth in claim 1 in which said metal is a chromium-containing metal.

6. The process set forth in claim 1 in which said metal consists of about 18% chromium, about 8% nickel, less than 0.2% carbon and approximately 74% iron.

GEORGE DE WITT GRAVES.